Figure 1:
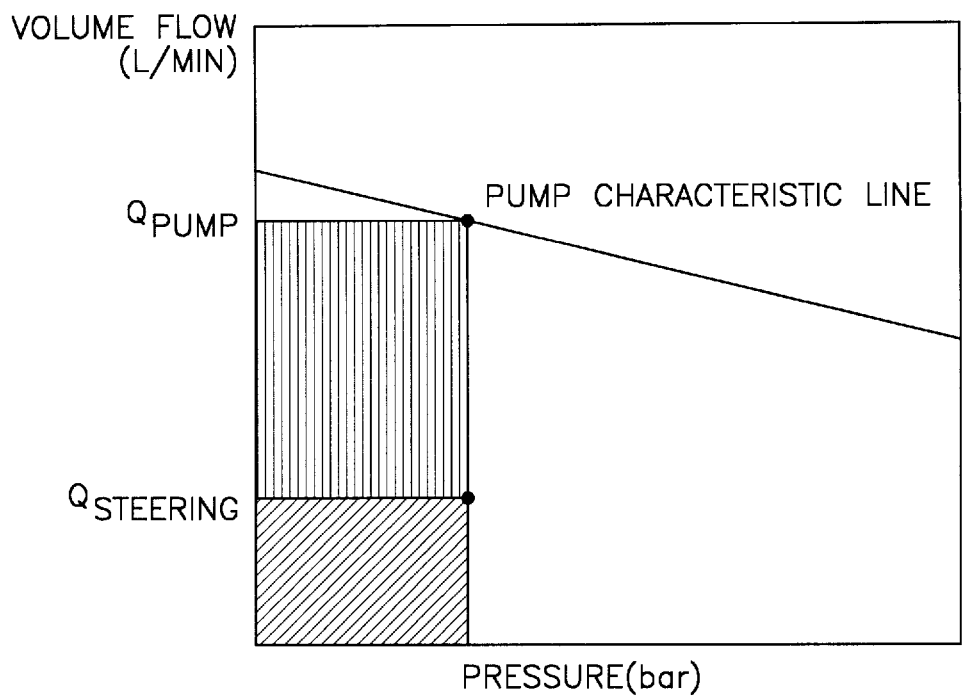

United States Patent [19]
Spillner

[11] Patent Number: 5,816,360
[45] Date of Patent: Oct. 6, 1998

[54] METHOD FOR CONTROLLING THE PUMP SPEED OF A HYDRAULIC POWER STEERING DEVICE

[75] Inventor: Robert Spillner, Düsseldorf, Germany

[73] Assignee: TRW Fahrwerksysteme GmbH & Co. KG, Dusseldorf, Germany

[21] Appl. No.: 647,859

[22] Filed: May 3, 1996

[30] Foreign Application Priority Data

May 5, 1995 [DE] Germany .................. 195 16 498.9

[51] Int. Cl.⁶ .................................................. B62D 5/09
[52] U.S. Cl. ...................... 180/417; 180/421; 180/422
[58] Field of Search ............................. 180/417, 421, 180/422

[56] References Cited

U.S. PATENT DOCUMENTS 5,489,006  2/1996  Saiia et al. ..................... 180/421 X
5,701,970  12/1997  Arbjerg ............................ 180/417

FOREIGN PATENT DOCUMENTS 534332  3/1993  European Pat. Off. .
0591653  4/1994  European Pat. Off. .
4032876  4/1992  Germany .
4301581  7/1994  Germany .

Primary Examiner—Joseph D. Pape
Attorney, Agent, or Firm—Tarolli, Sundheim, Covell, Tummino & Szabo

[57] ABSTRACT

In order to improve a method for controlling the speed of an electromotor-driven pump of a hydraulic power steering device of a motor vehicle as a function of the steering speed, so that the overall efficiency of the system is optimized in a simple manner; it is proposed that the required volume flow of hydraulic fluid, calculated according to a determined steering speed, is increased up to a maximum by an additional correction factor that takes into account the overall efficiency of the system, in order to use the result to calculate and to adjust the set speed of the pump.

11 Claims, 3 Drawing Sheets

METHOD FOR CONTROLLING THE PUMP SPEED OF A HYDRAULIC POWER STEERING DEVICE

The invention pertains to a method for controlling the speed of an electromotor-driven pump of a hydraulic power steering device of a motor vehicle as a function of the steering speed.

In known steering systems of a similar type, at low system pressure a constant delivery volume flow runs through a steering valve to a tank, even when a power steering boost is not needed. The result is a constant power consumption by the power steering system, which is noticed as increased fuel consumption. In addition, the power steering system with flowing fluid represents a constant source of noise.

To optimize steering systems of this kind, and in particular to improve the economy, in the state of the art the use of a so-called standby switching unit is proposed. As soon as the steering torque falls below a torque threshold, the standby switching unit reduces the speed of the electromotor and thus the delivery volume flow in the pump.

From DE-OS 4,301,581 a related method for controlling a pump in a motor vehicle is known, whereby ensuring an energy-saving operation of the pump, it is suggested to keep the speed of the pump at a constant, reduced value below the limit of steering speed, as a function of the steering speed, and then to increase it linearly or stepwise only when the steering speed limit is exceeded. The constant speed is thus adjusted such that volume flow is adjusted at a specified steering speed limit. Ignoring the fact that this method can mean that the volume flow may not be sufficient, at least for a short time, based on a purely empirical approximation, only a rough efficiency optimization is obtained. In addition, system-based factors cannot be taken into account, so that the method will not produce economic improvements equally in all cases.

In U.S. Pat. No. 4,032,876 A1 a motor speed controller is presented which keeps the motor speed constant until a flow limit is reached. From EP 0,534,332 A1 a power steering unit is known in which the rotational speed of the steering wheel is determined by a sensor and is used by means of pulse-width modulation to control the electromotor driving the pump based on the rotational velocity. An optimum efficiency does not occur; rather, a proportional relationship between the rotational velocity of the steering wheel and the power output of the power steering unit is produced.

Proceeding from this state of the art, the present invention is based on the problem of improving a method for controlling the speed of an electromotor-driven pump of a hydraulic power steering device of a motor vehicle as a function of the steering speed such that in this manner the overall efficiency of the system can be optimized.

The term "overall efficiency" as used in the present invention means the product of the engine pump efficiency and the hydraulic valve efficiency. These factors can deviate from empirical averages depending on the particular application and installation conditions.

For a technical solution to this problem, the invention proposes that the required volume flow of hydraulic fluid, calculated according to a determined steering speed, is increased up to a maximum by an additional correction factor that takes into account the overall efficiency of the system, using the result to calculate and to adjust the rated speed of the pump.

Due to the invented solution, an empirically determined, lower constant speed value is not merely adjusted until it is no longer sufficient for the actual purpose; rather, a minimum speed value is increased by a correction value taking into account both the motor pump efficiency and the hydraulic valve efficiency, so that a corresponding, minimum power consumption will result. This power, on the one hand, is spontaneously available when an increased volume flow is required, and on the other hand, the overall efficiency of the system will be optimized by this method.

According to one proposal of the invention, the steering speed is determined by measuring the steering rotational speed. According to another proposal of the invention, the hydraulic flow is measured.

According to one particularly favorable proposal of the invention, the correction factor is determined as a function of the particular steering fluid volume flow. This method can be computer-supported, and correction values are saved according to the flow of steering fluid. These values can be saved according to the particular system. Overall, a system capable of learning is obtained which determines the efficiency as a function of the particular adjusted values taking into account the motor-pump efficiency and the hydraulic valve efficiency, and changes the correction values for the optimization. The motor and hydraulic efficiencies can be saved in a computer in a table in a known manner for retrieval. The corresponding formulas are already known. Taking into account the particular application, an optimum correction value can be established as a function of the particular steering fluid volume flow, in order to correct the required hydraulic flow calculated based on a determined steering speed, in order to optimize the overall efficiency of the system.

According to another proposal of the invention, motor speed control takes place by means of a pulse-width modulation method.

The invented method is easy to use and can be retrofitted to existing systems. The system efficiency is optimized and the economy of the use of such systems is thus improved significantly.

Additional advantages and properties of the invention are obtained from the following description based on the figures.

Figure 2:
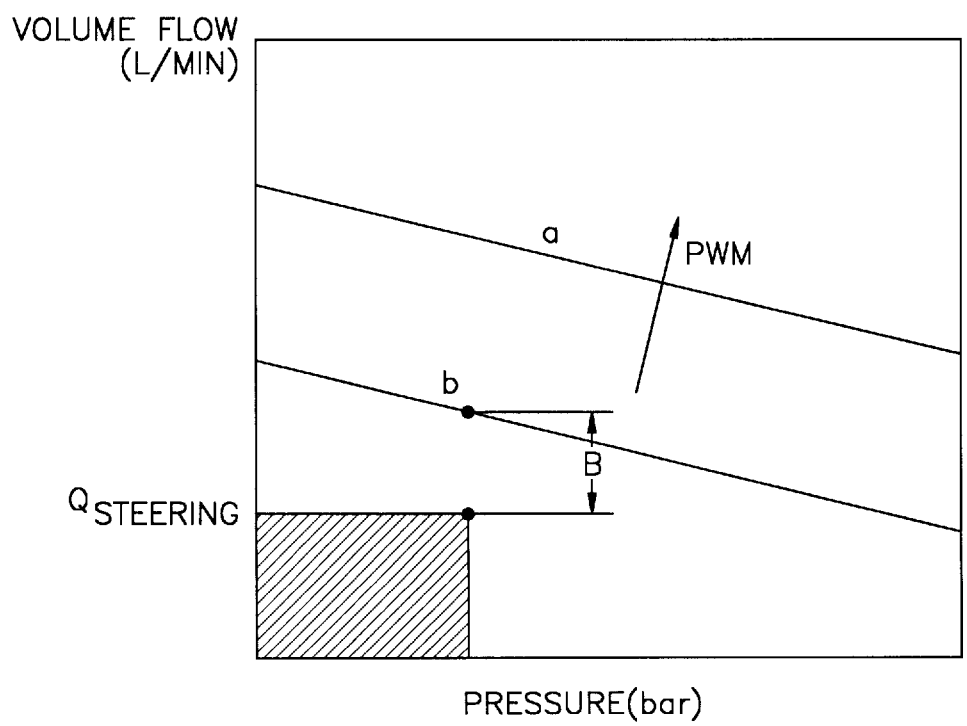
Figure 3:
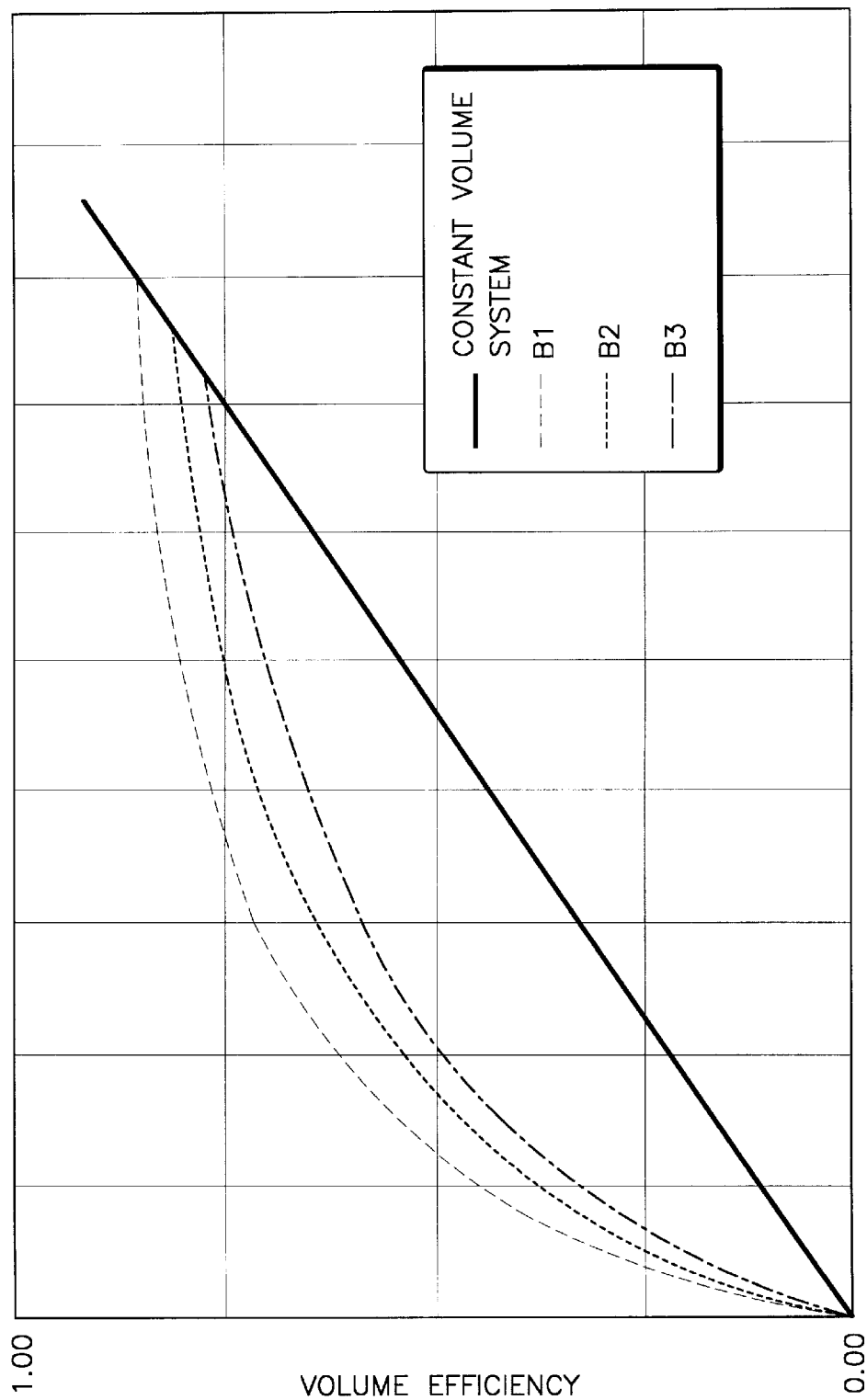

Shown are:

FIG. 1: A volume flow/pressure diagram without control method;

FIG. 2: A volume flow/pressure diagram with control method;

FIG. 3: A volume flow/valve efficiency diagram and

Figure 4:
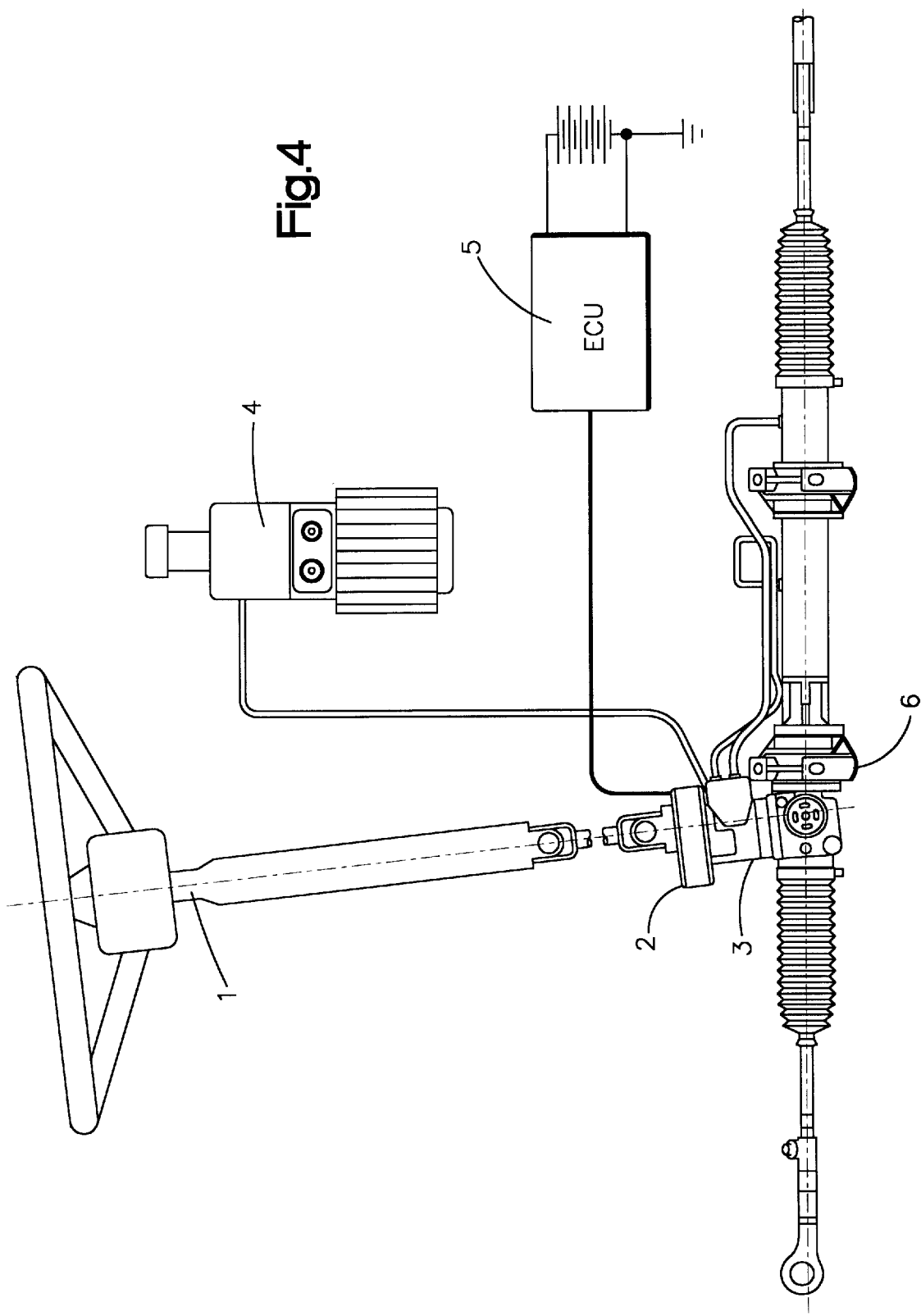

FIG. 4: A schematic representation of a steering system.

In FIG. 1, the pressure is plotted on the abscissa and the volume flow on the ordinate. In conventional power steering systems, hydraulic power is consumed by the steering system based on a given steering volume flow Qsteering for a given cylinder pressure pcyl, while the remainder of the volume flow additionally supplied by the pump (Qpump−Qsteering) represents a power loss at the pressure pcyl.

In the system shown in FIG. 2, the volume flow required on the basis of a measured steering rotational speed, plus a correction factor B, is provided, from which the pump characteristic line b is obtained. By means of pulse-width modulation, this characteristic line can be increased up to the line 'a', which shows the profile at 100% input voltage, that is, up to the maximum volume flow.

The profile of the hydraulic valve efficiency is presented in FIG. 3 as a function of the steering speed for a constant volume flow system and various correction values B of a system with controlled pump characteristic lines. Here it results, that for low to medium steering speeds, the invented method offers a clear efficiency advantage over known constant volume flow systems, and thus a smaller power consumption will result.

The described adaptation of the volume flow to the actual steering volume flow for a falling pump characteristic line (FIG. 1) requires monitoring of the parameters of the cylinder pressure, that is, for example, the power consumption of the motor, and the steering speed. Both parameters define a state in the volume flow/pressure diagram, depending on the steering transmission parameters, so that the required rotational speed of the motor pump aggregate can be calculated taking into account the desired bypass flow B. Consequently, reduced noise and energy savings can be obtained due to overall system optimization.

After controlling the speed of the motor, which keeps the motor speed constant until the flow limit is reached, only one parameter, namely the steering speed, is needed to adapt the delivery volume flow to the steering volume flow, taking into account this kind of characteristic line.

In the steering system shown in FIG. 4, a steering shaft 1 is provided with a velocity sensor 2 and is connected to a steering valve 3. This valve is supplied with hydraulic power by a motor pump unit 4 as a function of the control of an electronic unit 5, which in turn is connected to the velocity sensor 2. Due to the hydraulic support, the steering power to be applied to actuate the steering transmission 6 is boosted.

Reference list
Qpump, Volume flow, pump
Qsteering, Required steering volume flow
pcyl, Cylinder pressure
B, Correction value
b, Characteristic line of the motor pump aggregate for input voltage reduction
a, Characteristic line of the motor pump aggregate at 100% input voltage
PWM, Pulse-width modulation
1, Steering shaft
2, Velocity sensor
3, Steering valve
4, Motor pump unit
5, Electronic unit
6, Steering transmission

I claim:

1. A method for controlling the amount of steering assistance provided by a power steering system in a vehicle by controlling the flow of hydraulic fluid to a steering valve in the power steering system, said method comprising the steps of:

providing a hydraulic pump for supplying hydraulic fluid to the steering valve;

providing an electromotor for driving the hydraulic pump;

sensing a steering system variable;

determining an initial volume of flow of hydraulic fluid to be supplied to the steering valve by the hydraulic pump as a function of the sensed steering system variable;

determining a factor by which the initial volume of flow is to be increased to an adjusted volume of flow for providing a spontaneously available reserve volume of flow; and setting the rotational speed of the electromotor based on the adjusted volume of flow so that the electromotor drives the hydraulic pump at a speed which will supply the steering valve with hydraulic fluid at the adjusted volume of flow, wherein the factor varies so that the adjusted volume of flow does not exceed a maximum hydraulic fluid output of the hydraulic pump.

2. The method of claim 1 wherein the sensed steering system variable is the rotational speed of a steering shaft in the vehicle.

3. The method of claim 1 wherein the factor is determined as a function of the initial volume of flow of hydraulic fluid.

4. The method of claim 1 further comprising the step of:

continuously repeating the steps of determining an initial volume of flow as a function of the sensed steering system variable, determining a factor by which the initial volume of flow is increased to an adjusted volume of flow, and setting the rotational speed of the electromotor based on the adjusted volume of flow.

5. The method of claim 4 further comprising the step of:

storing the factor used with each volume of flow to create a table for optimizing the factor.

6. The method of claim 1 wherein the step of setting the rotational speed of the electromotor includes modulating the width of pulses of electrical current to the electromotor.

7. The method of claim 1 wherein the step of determining the factor includes evaluating the efficiency of the electromotor and the associated hydraulic pump, and evaluating the efficiency of the steering valve.

8. A method for controlling the amount of steering assistance provided by a power steering system in a vehicle by controlling the flow of hydraulic fluid to a steering valve in the power steering system, said method comprising the steps of:

providing a hydraulic pump for supplying hydraulic fluid to the steering valve;

providing an electromotor for driving the hydraulic pump;

sensing a steering system variable;

determining an initial volume of flow of hydraulic fluid to be supplied to the steering valve by the hydraulic pump as a function of the sensed steering system variable;

determining a factor for adjusting the initial volume of flow to provide a spontaneously available reserve volume of flow;

calculating an adjusted volume of flow which includes the reserve volume of flow by adding the factor to the initial volume of flow; and setting the rotational speed of the electromotor based on the adjusted volume of flow so that the electromotor drives the hydraulic pump at a speed which will supply the steering valve with hydraulic fluid at the adjusted volume of flow, wherein the factor varies with the initial volume of flow so that the adjusted volume of flow does not exceed a maximum hydraulic fluid output of the hydraulic pump.

9. The method of claim 8 wherein the sensed steering system variable is the rotational speed of a steering shaft in the vehicle.

10. The method of claim 8 wherein the factor is determined as a function of the initial volume of flow of hydraulic fluid.

11. The method of claim 8 wherein the step of determining the factor includes evaluating the efficiency of the electromotor and the associated hydraulic pump, and evaluating the efficiency of the steering valve.

* * * * *